March 11, 1958
C. M. MacDONALD
2,826,625
THERMO-COUPLE
Filed Aug. 30, 1954
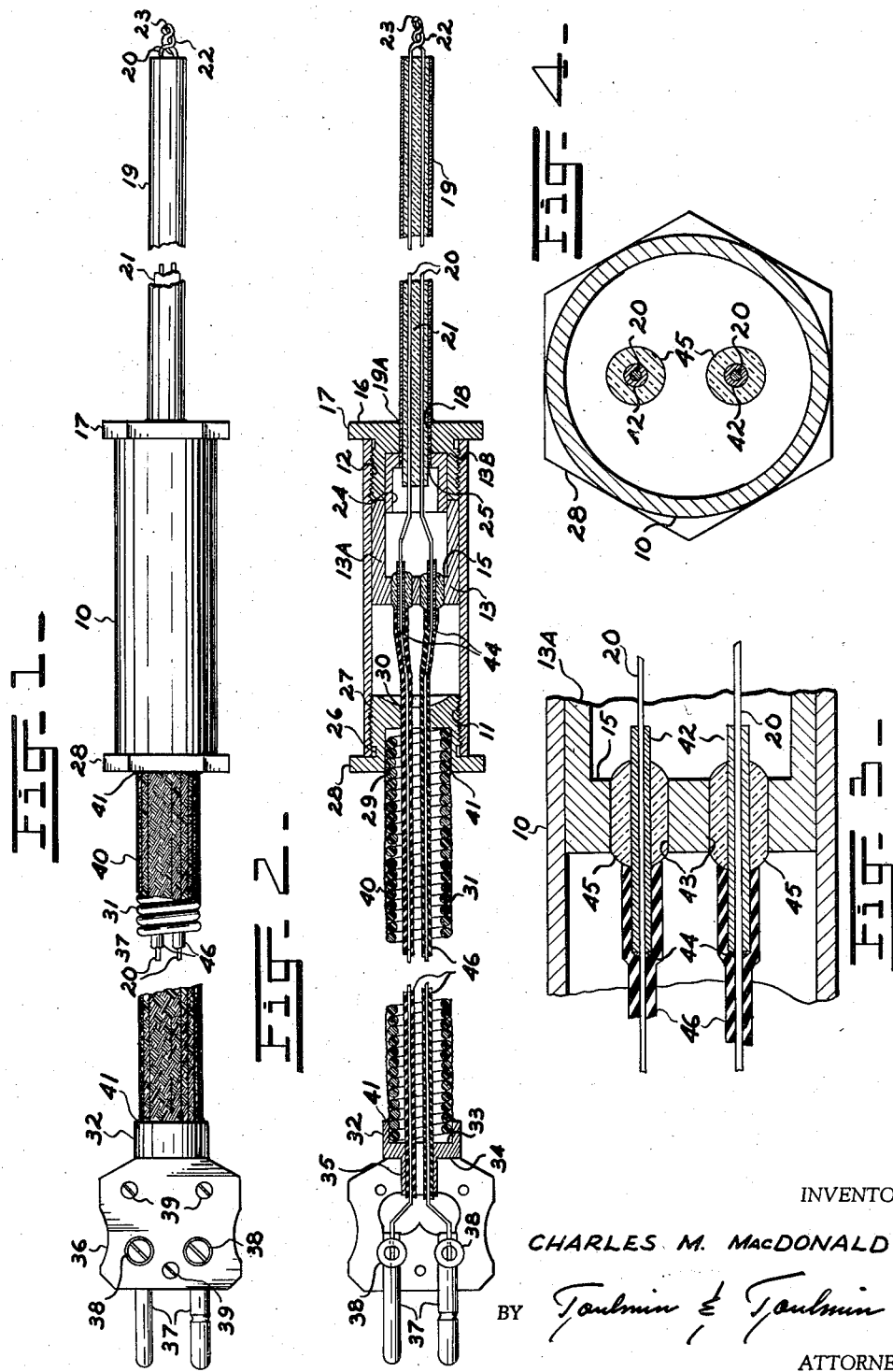
INVENTOR
CHARLES M. MacDONALD
BY Toulmin & Toulmin
ATTORNEYS

United States Patent Office 2,826,625
Patented Mar. 11, 1958

2,826,625

THERMO-COUPLE

Charles M. MacDonald, Cincinnati, Ohio

Application August 30, 1954, Serial No. 452,878

5 Claims. (Cl. 136—4)

This invention relates to a high temperature indicator, more particularly, to a thermocouple device for measuring temperatures at points considerably within a body of gas or liquid.

In the measuring of high temperatures at points within a body of gas or liquid, it is conventional practice to employ a thermocouple. The thermocouple is usually constructed in such a manner that it may be inserted into the body of gas or liquid and suitably supported on the wall containing the body of fluid. The thermocouple itself essentially comprises a juncture of two metals which have substantial opposing temperature-E. M. F. relations as, for example, shown on page 1694 of "Chemical Engineer's Handbook," by McGraw-Hill Book Company. When the juncture of these two metals is heated a minute but measurable electric voltage is generated. This electric voltage may be amplified or directly calibrated to give an accurate indication of the temperature.

In the conventional temperature indicating device which employs a thermocouple, leads extend from the thermocouple through a metal tube and then into a body member. In the body member a second set of leads are suitably connected to the thermocouple leads and pass to contacts which, in turn, may be connected either to an amplifier or a calibrating instrument. By connecting the contact leads to the thermocouple leads a welded joint is invariably employed. This joint frequently gives rise to inaccurate indications. It can be seen that since the amount of voltage carried by these leads is small, any imperfection in the joint may affect the ultimate readings obtained from the temperature indicating device. In addition, this joint is frequently not insulated from the body of gas or liquid. Consequently, heat from the body of gas or liquid may pass directly to the joints and consequently affect the readings which are received upon the calibrating instrument.

Many temperature indicating devices have been proposed purporting to eliminate the above described disadvantages. However, these devices are invariably complex in structure so as to result in the device being expensive, or their construction may be of such a nature that the undesirable features mentioned above are not fully eliminated.

The present invention discloses a thermocouple temperature indicating device which eliminates the above-mentioned disadvantages. The thermocouple device disclosed as this invention essentially comprises a tubular body member which has a metallic tube extending from one end thereof. A thermocouple is carried at the free end of this metal tube. A suitable flexible tube extends from the other end of the body member, and a set of electrical contacts are carried by the free end of the flexible tubular member. A pair of continuous leads interconnect the thermocouple and the contacts, said leads pass through the flexible tube to the body member and through the metallic tube. In addition, a sealed chamber is provided at that end of the body member which is adjacent the body of gas or liquid which is to be measured. This chamber serves to prevent heat from travelling along the body member. Because of the novel construction of this device, continuous leads may be used without the necessity for any junction therein. Since the thermocouple leads are continuous and pass through the closed chamber at one end of the body member, it can be seen that more accurate results may be obtained by employing this temperature indicating device. Because of its structure, this temperature indicating device is readily adapted for use in the manufacture of steel to measure the temperature at points within the mass of molten steel. Many other uses will be readily suggested as the structure of the temperature indicating device is described in detail.

It is, therefore, the principal object of this invention to provide an improved form of a thermocouple temperature indicator.

It is another object of this invention to provide a temperature indicator employing a thermocouple to give accurate readings at points within a body of gas or liquid.

It is a further object of this invention to provide a thermocouple device wherein the thermocouple leads are continuous from the thermocouple to the electrical contacts.

It is an additional object of this invention to provide a thermocouple device which may be readily assembled or disassembled as required.

It is a still further object of this invention to provide a temperature indicating device which is simple but yet substantial in construction so as to give accurate temperature measurements over a long period of time.

Other objects and advantages of this invention will become readily apparent upon references to the following description when taken in conjunction with the accompanying drawing wherein:

Figure 1 is an elevational view of the thermocouple temperature indicator disclosed as this invention;

Figure 2 is a vertical sectional view taken along the longitudinal axis of the temperature indicating device;

Figure 3 is a fragmentary sectional view in enlarged scale of the seals between the thermocouple leads and the end wall of the cylindrical plug; and Figure 4 is a transverse sectional view taken along the lines 4—4 of Figure 2.

Referring back to the drawing, more particularly to Figure 1 wherein like reference symbols indicate the same parts throughout the various views, the temperature indicating device comprises a hollow cylindrical body member 10 which is preferably made of steel. Each end of the body member 10 is open and there are internal threads 11 and 12 on each of the open ends.

A cylindrical plug or closure member 13 having external threads 14 is threadedly received within the internal threads 12 on the body member. The cylindrical plug 13 is made up of two cup-shaped sections 13A and 13B which are assembled by being joined at the abutting edges by brazing. The joined sections form a chamber in the plug. Each of the sections is preferably made of steel. The cylindrical plug 13 comprises an inner end wall 15 and an outer end wall 16. There is an hexagonally shaped flange 17 on the outer end wall 16, which flange engages an end of the body member 10. There is an axial bore 18 in the outer end wall 16 which bore closely receives a metallic tube 19. The metallic tube 19 is of rigid construction and extends axially a considerable distance outwardly of the cylindrical plug 13. This tube is preferably made of steel and is received within the bore 18 by brazing, as indicated at 19A. Its length depends upon the depth to which it is desired to submerge the thermocouple. In normal size temperature indicators, the length of this tube may vary anywhere from 8 to 12 inches.

A pair of leads 20 pass through the metallic tube 19 and are separated from the interior of the tube and from each other by a ceramic insulator 21. These leads are of metals which are widely opposing temperature-E. M. F. relations, such as iron and constantan. The leads 20 are then twisted together at 22 outside of the free end of the metallic tube 19 and are suitably joined together to form a thermocouple 23. These leads may be joined together by means of a fusion weld or by a globule of silver solder.

In order to adequately support the end of the metallic tube which is inserted into the cylindrical plug 13, there is a cup-shaped member 24 which is snugly fitted within the cylindrical plug 13, adjacent the outer end wall 16. The cup-shaped member 24 overlaps the joint between the plug sections 13A and 13B and is secured to the inner wall of the plug 13 preferably by brazing. The cup-shaped member 24 has an axial bore 25 therethrough which is aligned with the axial bore 18 in the outer end wall of the cylindrical plug. The metallic tube 19 is closely received within both of these bores.

Proceeding now to the other end of the body member 10 there is a cylindrical plug 26 preferably made of steel and having external threads 27 and which is threadedly received within the internal threads 11. This cylindrical plug 26 also has a hexagonally shaped flange 28, the inner surface of which is adapted to engage the end of body member 10. There is a cylindrical recess 29 in the outer surface of the cylindrical plug 26. An axially extending bore 30 interconnects the bottom of the cylindrical recess 29 with the inner surface of the cylindrical plug 26.

Closely received within the cylindrical recess 29 is one end of a flexible tube 31 which comprises a spirally wound spring-like element. The other end of the flexible tube 31 is closely received within a tubular metallic member 32 and engages an internal shoulder 33 within the member 32. There is an external shoulder 34 upon the member 32. The small diameter portion of the tubular member 32 is snugly received within an opening 35 in an electrical plug 36 to bring the external shoulder 34 into engagement with the plug 36. The electrical plug 36 has a pair of contact elements 37 and cooperating contact screws 38. The electrical plug 36 is preferably made in two sections and is held in assembled position by means of assembly screws 39. A protective covering 40 comprising a flexible metallic braided element encases the flexible tube 31. The protective covering may also be made of a glass fiber material or any other suitable material. Each end of the protective covering 40 is respectively inserted into the cylindrical plug 26 and the metallic member 32 and is secured therein by soldering as indicated at 41. This not only fixes the protective covering to the end members but also makes it quite effective for serving as a shield about the leads should the place where the thermocouple is used require this protection. In addition, the soldering of the protective covering to the metallic end members definitely limits the amount of flexing that the plug end of the assembly can take, thus preventing the solid wires that lead from the thermocouple to the electrical plug from ever being flexed beyond a predetermined allowable limit.

Turning now to the leads 20, it can be seen that the leads are continuous and unbroken as they extend from the thermocouple 23 to the contact elements 37. In passing through the inner end wall 15 of the cylindrical plug 13 each of the leads 20 passes through a metallic tube 42 with each of said tubes 42 being positioned in an aperture 43 which is located in the inner end wall 15. Each of the leads 20 is secured in its respective metallic tube by means of a solder connection as shown at 44. In addition, a ceramic seal 45 seals each of the metallic tubes 42 into the apertures 43.

As the leads 20 emerge from the cylindrical plug 13, each lead is encased in an electrical insulator 46 and these insulators 46 surround the leads as they extend through the flexible tube 31 to be connected with the contact elements 37 in the electrical plug 36.

The manner in which the leads 20 pass through the inner wall of the cylindrical plug 13 and the solder connections with the metal tubes 42 are shown in enlarged scale in the views of Figures 3 and 4.

It can be seen that with this construction of a temperature indicating device, there is no possibility of the hot gases or liquids which are being measured passing into the body of the device. Any such liquids or gases which may travel up the metal tube and into the cylindrical plug 13 will be entrapped there because of the ceramic seals 45 which enclose the thermocouple leads as they pass through the inner end wall of the cylindrical plug. Consequently, the cylindrical plug 13 acts as a barrier for substances of which the temperature is being measured. This chamber formed by the cylindrical plug 13 also serves as an insulating chamber.

The insulating chamber in the cylindrical plug 13 permits shorter leads between the tubular body 10 and the electrical contacts 37. Since the chamber considerably reduces the heat conducted through the metallic tube 19 from the material being treated, it is not necessary to space the contacts a great distance from the material to escape the effects of the heat measured by the thermocouple. Thus, continuous leads without any joints therein are possible since the total length of the leads is considerably shortened by this invention.

In order to partially dismantle this temperature indicating device it is only necessary to loosen the contact screws 38 and then to remove the contact elements 37 and the electrical plug 36 from the ends of the leads 20. Subsequently, the cylindrical plugs 13 and 26 may be unthreaded from the body member 10. As the flexible tube 31 has an inner diameter which is considerably greater than the diameter of the electrical insulators 46, the leads and insulators will pass freely through the flexible tube and the cylindrical plug 26. It is, therefore, apparent that this temperature indicating device essentially comprises three units, namely the tubular body member the cylindrical plug with the metallic tube attached thereto, and the cylindrical plug with the flexible tube and electrical plug attached thereto.

In operation, the metallic tube may be inserted through a suitable aperture in order to immerse the thermocouple within a body of gas or liquid to the depth desired. As an alternative method the temperature indicating device may be supported by mounting the tubular body member in suitable supporting brackets. As the thermocouple reaches the temperature at that point in the gas or liquid body, an electromotive force is generated at the junction of the thermocouple leads. This, in turn, causes a current to pass along the leads 20 to the contact elements 37. At this point the contacts may be connected to any sensitive detecting instrument such as a millivoltmeter, milliameter or galvanometer, which is calibrated in terms or temperature or, if desired, the current may be amplified in a suitable or well-known manner and subsequently conducted to an indicating device.

From the foregoing description, it is evident that this invention discloses an improved thermocouple temperature indicating device which gives accurate measurements over a long period of time by employing a continuous lead from the thermocouple to the electrical contacts. In this invention junctures or connections of leads within the device are completely eliminated. In addition, this structure provides that no gases or liquids may escape into the body of the temperature indicating device. This will result in accurate temperature measurements. Furthermore, the expense of constructing such a temperature indicating device has been greatly reduced because it is not necessary to tightly fit the ceramic insulator within the metallic tube. Any gases or the like which may escape between the ceramic insulator 21 and the interior of the metallic tube 19 are checked within the chamber of the cylindrical plug which supports the metallic tube by the solder connections 44 between the metal tubes and the leads passing therethrough.

Since sealing is not obtained solely by means of the ceramic insulator 21 within the metallic tube 19, it can be seen that this temperature indicating device will have a longer life because there is no tendency for the insulator to crack or become porous on account of its extreme length or due to wide temperature fluctuations to which the thermocouple may be subjected.

In addition, this invention discloses a thermocouple device which has a flexible connection thereto but undue flexing of the thermocouple leads will not occur because of the limiting action of the metallic braided covering since it is attached at each end to a metallic element.

It will be understood that this invention is susceptible to modification in order to adapt it to different usages and conditions and, accordingly, it is desired to comprehend such modifications within this invention as may fall within the scope of the appended claims.

What is claimed is:

1. A thermocouple temperature indicator comprising a hollow cylindrical body member, a closure member having a flat outer end and an inner end and having a chamber therein, said closure member being detachably secured in one end of said body member to close said end, there being an opening in said flat outer end and a pair of openings in said inner end of said closure member, a metallic tube closely secured within said closure member outer end opening and extending outwardly therefrom, a ceramic insulator in said tube, a pair of leads of dissimilar metals passing through said insulator and spaced from the walls of said tube to form a bared thermocouple projecting from the free end of said tube, support means extending outwardly from the outer end of said cylindrical body member in a straight line with said metallic tube and cylindrical body member, electrical contacts on the free end of said support means, said leads passing outwardly from said closure member chamber through said pair of openings in the inner end thereof through said cylindrical body member and support means to connect with said electrical contacts, and means sealing each of said leads as it passes through the openings in the inner end wall of said closure member to close said closure member chamber.

2. A thermocouple temperature indicator comprising a hollow cylindrical body member, a front closure member having a flat outer end and an inner end and having a chamber therein, said front closure member being detachably secured in one end of said body member to close said end, there being an opening in said flat outer end and a pair of openings in said inner end of said closure member, a metallic tube closely secured within said closure member outer end opening and extending outwardly therefrom, a ceramic insulator in said tube, a pair of leads of dissimilar metals passing through said insulator to form a bared thermocouple projecting from the free end of said tube, a rear closure member detachably secured in the other end of said body member having a passage therethrough, supporting means extending outwardly from said rear closure member and forming a straight line with said metallic tube and said cylindrical body member, electrical contacts on the free end of said support means, said leads passing outwardly from said front closure member chamber through said pair of openings in the rear end thereof through said cylindrical body member, said rear closure member and support means to connect with said electrical contacts, and means sealing each of said leads as it passes through the openings in the inner end wall of said front closure member to close said closure member chamber.

3. A thermocouple temperature indicator comprising a hollow cylindrical body member, a front closure member having a flat outer end and an inner end and having a chamber therein, said front closure member being detachably secured in one end of said body member to close said end, there being an opening in said flat outer end and a pair of openings in said inner end of said closure member, a metallic tube closely secured within said closure member outer end opening and extending outwardly therefrom, a ceramic insulator in said tube, a pair of leads of dissimilar metals passing through said insulator to form a bared thermocouple projecting from the free end of said tube, a rear closure member detachably secured in the other end of said body member, a flexible support member comprising a spiral spring extending outwardly from the outer end of said rear closure member and in its normal position forming a straight line with said metallic tube and cylindrical body member, electrical contacts on the free end of said flexible support, said leads passing outwardly from said front closure member chamber through said pair of said pair of openings in the inner end thereof through said cylindrical body member and flexible support means to connect with said electrical contacts, a flexible casing surrounding said flexible supporting member to limit the bending thereof and to prevent undue flexing of the leads passing therethrough, and means sealing each of said leads as it passes through the openings in the inner end wall of said front closure member to close said front closure member chamber.

4. In a temperature indicator, a cylindrical body member, a closure member having a chamber therein detachably received in one end of said body member, said closure member having a flat outer end and an inner end positionable within said tubular body member, there being an opening in said flat outer end and a pair of openings in said inner end of said closure member, a metallic tube closely secured within said closure member outer end opening and extending outwardly therefrom, a ceramic insulator in said tube, a pair of continuous leads of dissimilar metals forming a bared thermocouple projecting from the free end of said tube, and passing through said insulator to said closure member chamber and outwardly through the pair of openings in the inner end of said closure member and means for sealing each of said leads as it passes through the openings in the inner end wall of said closure member to close said closure member chamber.

5. In a temperature indicator as claimed in claim 4 with a cup like member being positioned within the chamber of said closure member contacting the outer end wall thereof and supporting the inner end of said metallic tube.

References Cited in the file of this patent

UNITED STATES PATENTS

| | | |
|---|---|---|
| 2,177,033 | Buell | Oct. 24, 1939 |
| 2,476,099 | Knudsen | July 12, 1949 |
| 2,587,391 | Seaver | Feb. 26, 1952 |
| 2,625,573 | Connell | Jan. 13, 1953 |
| 2,649,489 | Turkington | Aug. 18, 1953 |
| 2,706,411 | Bircher | Apr. 19, 1955 |

FOREIGN PATENTS

| | | |
|---|---|---|
| 132,132 | Great Britain | Sept. 11, 1919 |

OTHER REFERENCES

Journal of Scientific Instruments, vol. 9, 1932, pages 199 and 296.